United States Patent [19]

Hildebrand

[11] 4,229,996
[45] Oct. 28, 1980

[54] COMPACT FOUR SPEED AUTOMATIC TRANSMISSION

[75] Inventor: Daniel H. Hildebrand, Westland, Mich.

[73] Assignee: Ford Motor Company, Dearborn, Mich.

[21] Appl. No.: 966,979

[22] Filed: Dec. 6, 1978

[51] Int. Cl.² ................ F16H 47/08; F16H 57/10
[52] U.S. Cl. ................... 74/688; 74/750 R; 74/761; 74/763
[58] Field of Search ............. 74/688, 761, 763, 769, 74/753, 750 R

[56] References Cited

U.S. PATENT DOCUMENTS

| | | | |
|---|---|---|---|
| 2,478,868 | 8/1949 | Hasbany | 74/763 |
| 2,478,869 | 8/1949 | Hasbany | 74/763 |
| 3,396,606 | 4/1968 | Tuck | 74/688 X |
| 3,507,168 | 4/1970 | Carp | 74/688 |

Primary Examiner—C. J. Husar
Assistant Examiner—Frank McKenzie
Attorney, Agent, or Firm—Donald J. Harrington; Keith L. Zerschling

[57] ABSTRACT

A hydrokinetic torque transmitting mechanism having a torque converter and a compound planetary gear system in which the elements of the gear system are stacked in radial disposition, one with respect to the other, to form a multiple ratio torque delivery path with minimum axial dimensions.

3 Claims, 8 Drawing Figures

| | $CL_1$ | $CL_2$ | $CL_3$ | O.W.C. | $B_1$ | $B_2$ | Ratio Formula | Ratio |
|---|---|---|---|---|---|---|---|---|
| I | | X | | X | | | $\dfrac{S_2+R_2}{S_2}$ | 2.8 |
| II | | X | | | | X | $\dfrac{S_1+R_1}{R_1}$ | 1.56 |
| III | X | X | | | | | 1-1 | 1 |
| IV | X | | | | | X | $\dfrac{R_1R_2-S_1S_2}{R_1R_2}$ | .69 |
| R | | | X | | X | | $\dfrac{S_1S_2-R_1R_2}{S_1S_2}$ | -2.2 |

| | $CL_1$ | $CL_2$ | $CL_3$ | O.W.C. | $B_1$ | $B_2$ | Ratio Formula | Ratio |
|---|---|---|---|---|---|---|---|---|
| I | | X | | X | | | $\dfrac{S_2+R_2}{S_2}$ | 2.8 |
| II | | X | | | | X | $\dfrac{S_1+R_1}{R_1}$ | 1.56 |
| III | X | X | | | | | 1-1 | 1 |
| IV | X | | | | | X | $\dfrac{R_1R_2-S_1S_2}{R_1R_2}$ | .69 |
| R | | | X | | X | | $\dfrac{S_1S_2-R_1R_2}{S_1S_2}$ | -2.2 |

| | $CL_1$ | $CL_2$ | $CL_3$ | O.W.C. | $B_1$ | $B_2$ | Ratio Formula | Ratio |
|---|---|---|---|---|---|---|---|---|
| I | | X | | X | | | $\frac{S_2 + R_2}{S_2}$ | 2.8 |
| II | | X | | | | X | $\frac{S_1 + R_1}{R_1}$ | 1.56 |
| III | X | X | | | | | $1-1$ | 1 |
| IV | X | | | | | X | $\frac{R_1 R_2 - S_1 S_2}{R_1 R_2}$ | .69 |
| R | | | X | X | | | $\frac{S_1 S_2 - R_1 R_2}{S_1 S_2}$ | -2.2 |

| | $CL_1$ | $CL_2$ | $CL_3$ | O.W.C. | $B_1$ | $B_2$ | Ratio Formula | Ratio |
|---|---|---|---|---|---|---|---|---|
| I | | X | | X | | | $\dfrac{S_2 + R_2}{S_2}$ | 2.8 |
| II | | X | | | | X | $\dfrac{S_1 + R_1}{R_1}$ | 1.56 |
| III | X | X | | | | | $1-1$ | 1 |
| IV | X | | | | | X | $\dfrac{R_1 R_2 - S_1 S_2}{R_1 R_2}$ | .69 |
| R | | | X | | X | | $\dfrac{S_1 S_2 - R_1 R_2}{S_1 S_2}$ | -2.2 |

COMPACT FOUR SPEED AUTOMATIC TRANSMISSION

BRIEF DESCRIPTION OF THE INVENTION

My invention comprises improvements in multiple ratio compound planetary gearing such as that shown in U.S. Pat. Nos. 3,473,412; 3,473,413 and 2,478,868 (FIG. 4). Those reference patents disclose a compact planetary gear system in which gearing elements are arranged radially, one with respect to the other.

The improvements of my invention include a radial arrangement for the elements of the gearing and associated clutches and brakes to effect four forward-driving ratios, including an overdrive ratio and a single reverse ratio, with no more gear elements than the number of gear elements normally used in three-speed automatic transmissions. The clutches and brakes are strategically arranged to provide a minimum axial dimension of the transmission assembly whereby the transmission is adapted for a cross-drive arrangement with the engine centerline and the transmission centerline transversely disposed with respect to the centerline of the vehicle.

Fourth speed ratio operation is an overdrive wherein torque is delivered fully mechanically from the engine to the output shaft as the hydrokinetic torque converter is bypassed. During operation in the third speed ratio, a split torque delivery path is established with a portion of the torque being delivered mechanically and the balance being delivered hydrokinetically.

PARTICULAR DESCRIPTION OF THE INVENTION

Figures 1, 1A:
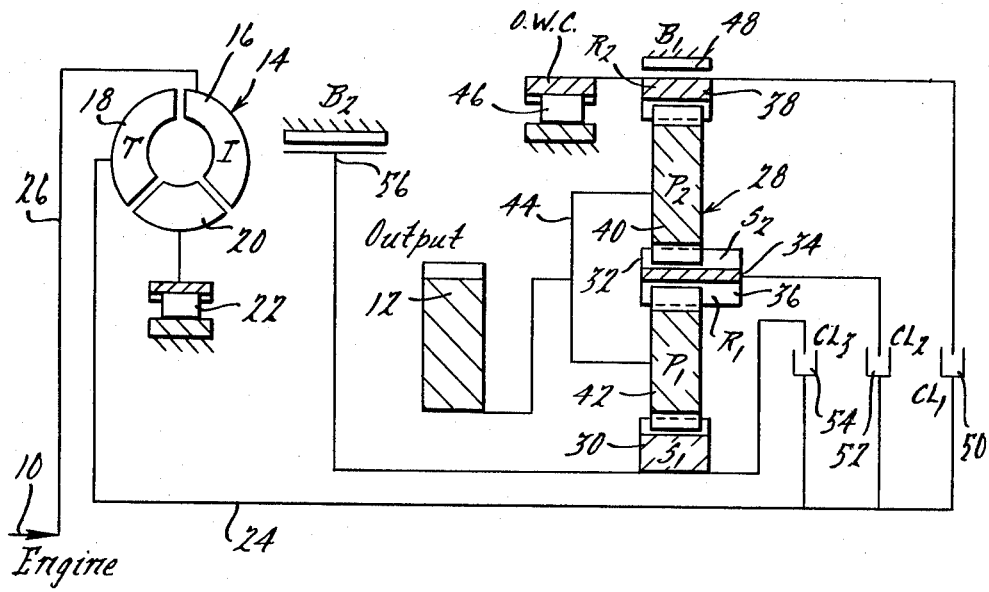
FIG. 1 shows a schematic representation of a compact planetary gear system and torque converter in combination.
FIG. 1A is a chart showing the clutch-and-brake engagement and release pattern for establishing multiple ratio changes in the structure of FIG. 1.

In FIG. 1 numeral 10 designates an engine driven crankshaft and numeral 12 designates a power output gear which may be connected drivably through a final drive gear system or a belt or chain to a power output differential mechanism for axles for the vehicle traction wheels. Numeral 14 designates generally a hydrokinetic torque converter which comprises a bladed impeller 16, a bladed turbine 18 and a bladed stator 20. The stator is mounted on a stator shaft and is provided with an overrunning brake 22 for braking the stator against rotation in a direction opposite to the direction of rotation of the engine but permitting freewheeling motion in the direction of rotation of the engine. The turbine 18 is connected drivably to turbine shaft 24 and the impeller 16 is connected to the crankshaft 10 through driveplate 26.

Compound planetary gearing 28 includes a first sun gear 30 and a second sun gear 32. Sun gear 32 is formed on ring 34 whereby the sun gear 32 and the ring gear 36 comprise a common element. A second ring gear 38 surrounds sun gear 30, sun gear 32 and ring gear 36.

Planet pinions 40 drivably engage sun gear 32 and ring gear 38. Planet pinions 42 drivably engage sun gear 30 and ring gear 36. Pinions 40 and 42 are carried by a common carrier 44 which is connected drivably to the output gear 12.

Overrunning brake 46 provides for reaction torque delivery from ring gear 38 to the stationary housing for the transmission. A selectively engageable friction brake 48 is situated in parallel relationship with respect to the overrunning brake 46 and is adapted to accommodate torque reaction delivery to the housing from the ring gear in a direction opposite to the direction of torque delivery through the overrunning brake 46.

Ring gear 38 is connected drivably to the turbine shaft 24 through selectively engageable friction clutch 50. The ring 34 of which sun gear 32 and ring gear 36 form a part is adapted to be connected drivably to the turbine shaft 24 through selectively engageable clutch 52. Sun gear 30 is adapted to be connected selectively to the turbine shaft 24 through friction clutch 54. Friction brake 56 is adapted to brake sun gear 30 when it is applied to anchor the associated brake drum connected to sun gear 30.

The overrunning coupling 46 accommodates torque reaction during operation in the low speed ratio. Clutch 52 is engaged during operation in the low speed ratio whereby the sun gear 32 acts as a torque input element and the carrier 44 acts as a torque output element. A ratio change from the lowest ratio to the intermediate second speed ratio is accomplished by engaging clutch 52 and brake 56.

With the sun gear 30 acting as a reaction member and the ring gear 36 acting as a torque input element, the carrier 44 and the output gear 12 are driven at an increased speed. A typical speed ratio is 1.56 in contrast to the low speed ratio 2.8.

Direct-drive, third speed ratio is achieved by locking the elements of the gear system together for rotation in unison. This is achieved by engaging simultaneously clutches 50 and 52.

Fourth speed overdrive operation is accomplished by disengaging the clutch 52 and engaging the clutch 50. With the sun gear 30 acting as a reaction point, the carrier 44 is driven with an overrunning ratio of 0.69:1.

Reverse drive is obtained by releasing clutches 50 and 52 and engaging clutch 54 while anchoring the ring gear 38 with the brake 48. A reverse ratio of −2.2:1 is achieved.

Figures 2, 2A:
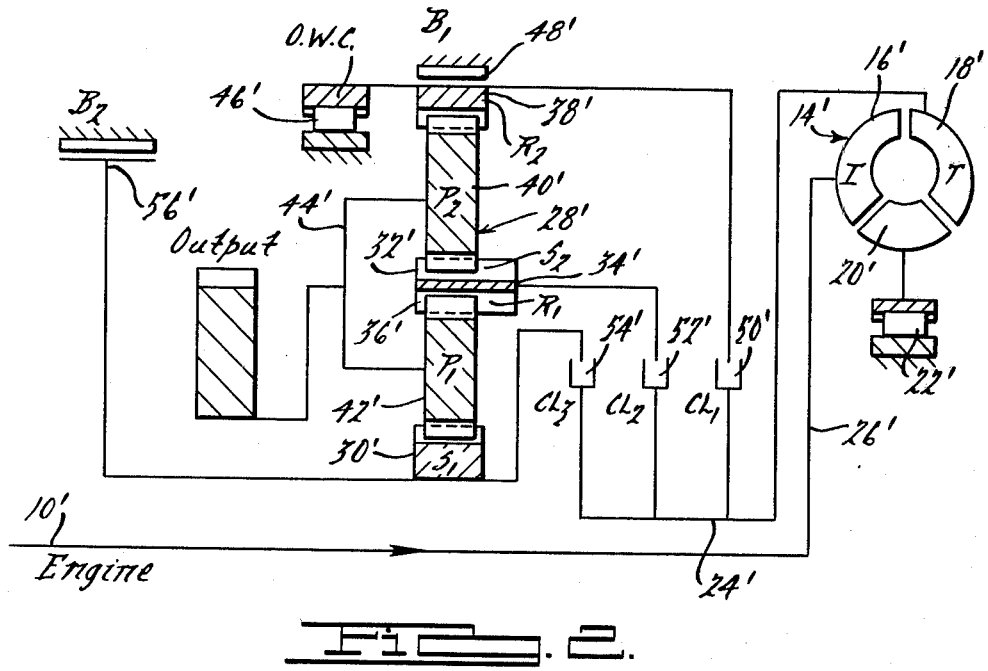
FIG. 2 is a view showing a modification of the structure of FIG. 1. It differs from the structure of FIG. 1 by the position of the converter at an outboard location rather than in the conventional arrangement shown in FIG. 1.
FIG. 2A is a chart showing the cclutch-and-brake engagement and release pattern for the structure of FIG. 2.

In the embodiment of FIG. 2 the same powerflow path and shift pattern is illustrated except that the converter position has been interchanged to provide an outboard location.

Figures 3, 3A:
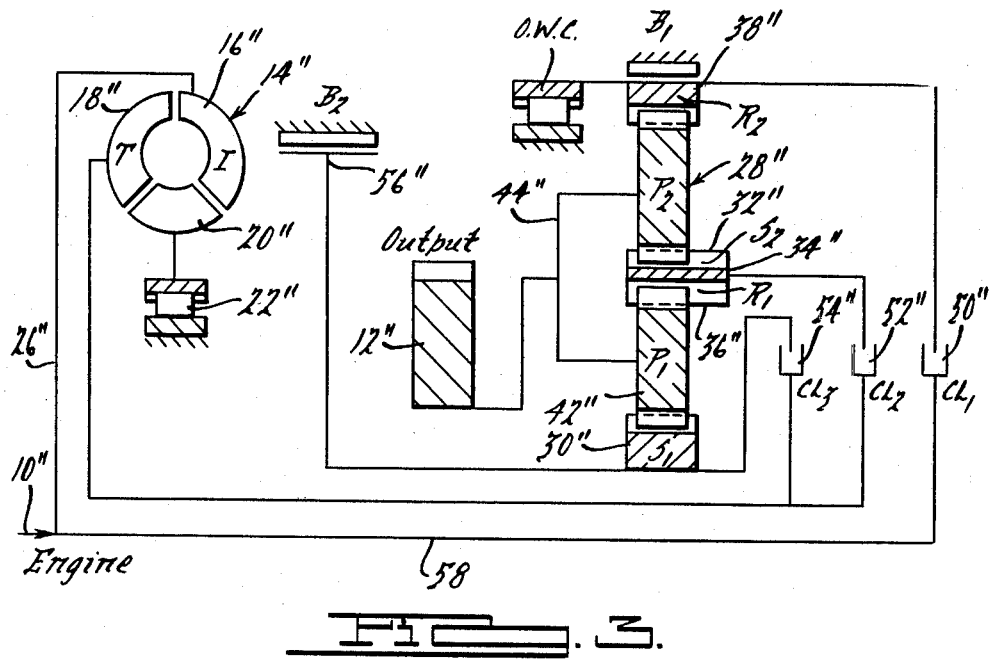
FIG. 3 is a modification of a compact, radially-arranged gear system similar to that shown in FIG. 1 but with a lockup clutch for the converter to establish a split torque drive in third gear and a solid drive in fourth gear.
FIG. 3A is a chart showing the clutch-and-brake engagement and release pattern for the transmission of FIG. 3.

In the embodiment of FIG. 3 I have shown the same general schematic arrangement illustrated in FIG. 1, but I have provided for a split torque delivery. The third direct-drive ratio and a fully mechanical torque delivery during overdrive operation is achieved by using a centrally disposed torque transfer shaft 58 which serves as a torque input element for clutch 50". Clutch 50" is engaged during operation in the third and fourth ratio just as in the case of clutch 50 in the FIG. 1 embodiment. In the FIG. 1 embodiment, however, turbine torque is delivered through the clutch 50 whereas in the FIG. 3 embodiment the clutch 50 connects directly to the ring gear 38" to the engine crankshaft 10". Clutch 50 connects directly the ring gear 38" to the engine crankshaft 10".

Figures 4, 4A:
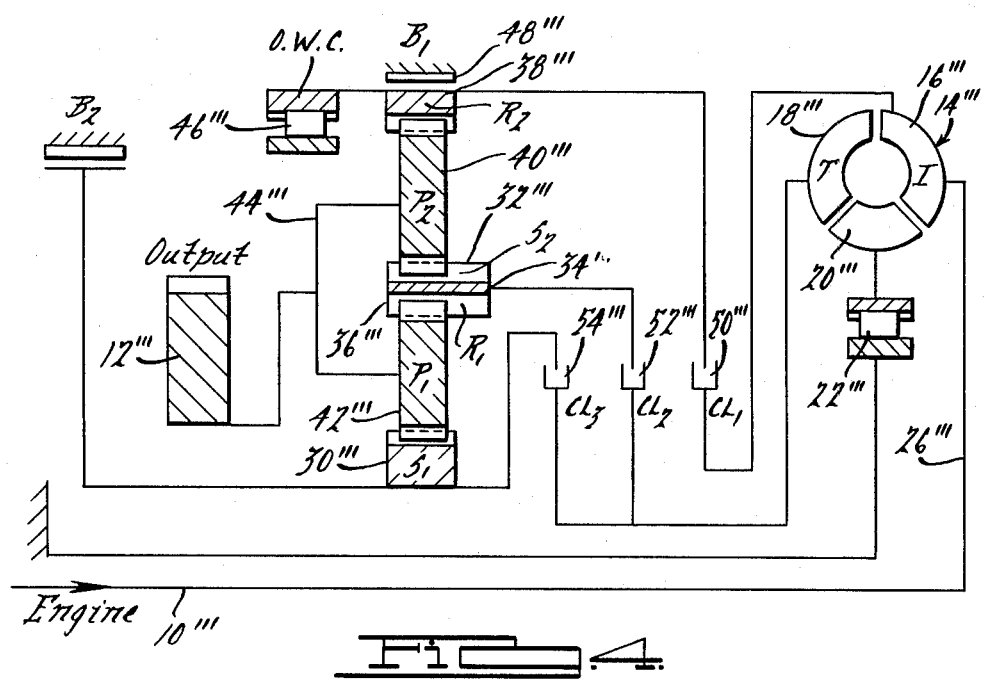
FIG. 4 shows a modification of the FIG. 3 arrangement wherein the converter is located at an outboard location rather than in the conventional position as shown at FIG. 3.
FIG. 4A is a chart showing the clutch-and-brake engagement and release pattern for the transmission of FIG. 4.

In the FIG. 4 arrangement a fully mechanical fourth ratio and split torque third drive ratio is accomplished just as in the FIG. 3 arrangement except that in the FIG. 4 arrangement the converter is located at an outboard location just as in the case of the FIG. 2 arrangement. The mode of operation and the torque delivery paths for the FIG. 4 arrangement are the same as the mode of operation and the torque delivery paths of the FIG. 3 arrangement.

In the FIG. 2 arrangement the clutch-and-brake elements and the gear elements have been indicated by reference characters that correspond to the reference characters used in FIG. 1 since they have similar functions. The have been designated, however, by prime notations. In the FIG. 3 arrangement the clutch-and-brake elements and gear elements that correspond to the elements in FIG. 1 have been designated by similar reference characters although double prime notations are used. Similarly, in the FIG. 4 arrangement triple prime notations are used to designate the elements that have a counterpart in the FIG. 1 arrangement.

Having described preferred embodiments of my invention, what I claim and desire to secure by U.S. Letters Patent is:

1. A planetary, multiple-ratio power transmission mechanism having compound gearing and a hydrokinetic unit, the hydrokinetic unit having an impeller and a turbine arranged in a toroidal fluid flow circuit; said planetary gearing comprising two sun gears, two ring gears, two sets of planet pinions and a carrier that is common to each set of planet pinions, a driven member connected to said carrier, a driving member connected to said impeller; a first of said sun gears, a first of said ring gears, a second of said sun gears and a second of said ring gears being arranged in radial disposition one with respect to the other; said first ring gear and said second sun gear being common and formed on a ring, the external teeth of said second sun gear being formed on the periphery of said ring and the internal teeth of said first ring gear being formed on the internal periphery of said ring, a first of said sets of planet pinions engaging drivably the first sun gear and said first ring gear, a second of said sets of planet pinions engaging drivably said second sun gear and said second ring gear, said planet pinions being rotatably supported by said common carrier; first selectively engageable clutch means for distributing driving torque to said second ring gear, second selectively engageable clutch means for delivering driving torque from said turbine to said ring, third selectively engageable clutch means for distributing driving torque from said turbine to said first sun gear, and brake means selectively engageable for anchoring said first sun gear during operation in the first and fourth speed ratios, said first and second clutches being engaged during third speed ratio operation and said first clutch means being engaged during overdrive operation, said third clutch means being engaged during reverse drive operation as said second ring gear acts as a reaction point during reverse drive.

2. The combination as set forth in claim 1 wherein said first selectively engageable clutch means has an input side connected to said turbine and an output side connected to said ring gear whereby turbine torque is delivered to said ring gear during third speed ratio operation and fourth speed ratio operation, and brake means for said first sun gear which is applied during fourth speed ratio operation whereby said carrier is driven in a forward direction relative to the direction of rotation of said turbine.

3. The combination as set forth in claim 1 wherein said first selectively engageable clutch means has an input side connected to said driving member and to said impeller whereby torque is distributed mechanically to said ring gear during third speed ratio operation to establish a split torque delivery path through said gearing and during fourth speed ratio operation to establish a fully mechanical torque delivery path through said gearing.

* * * * *